(12) United States Patent
Kauppila

(10) Patent No.: US 7,815,391 B2
(45) Date of Patent: Oct. 19, 2010

(54) STRUCTURAL MEMBER JOINTS

(76) Inventor: Richard W. Kauppila, 158 S. Basin Dr., Negaunee, MI (US) 49866

( * ) Notice: Subject to any disclaimer, the term of this patent is extended or adjusted under 35 U.S.C. 154(b) by 1306 days.

(21) Appl. No.: 11/189,040

(22) Filed: Jul. 25, 2005

(65) Prior Publication Data

US 2009/0133359 A1     May 28, 2009

Related U.S. Application Data

(60) Provisional application No. 60/590,874, filed on Jul. 23, 2004.

(51) Int. Cl.
*B25G 3/20* (2006.01)
*F16B 2/00* (2006.01)
*F16B 7/04* (2006.01)

(52) U.S. Cl. .............. 403/367; 403/192; 403/194; 403/377; 403/408.1; 411/60.1; 411/63; 411/73; 411/74; 52/585.1; 52/707; 29/525.02; 29/525.11

(58) Field of Classification Search ............... 403/192, 403/193, 194, 365, 367, 372, 377, 408.1, 403/231, 239, 240, 263, DIG. 13; 411/60.1, 411/32, 33, 60.2, 63, 71–75; 52/585.1, 704, 52/707; 29/525.01, 525.02, 525.11
See application file for complete search history.

(56) References Cited

U.S. PATENT DOCUMENTS

| | | | |
|---|---|---|---|
| 974,115 A | | 11/1910 | Parkin et al. |
| 1,354,549 A | | 10/1920 | Gilmer |
| 3,501,932 A | * | 3/1970 | Bishop .................. 70/90 |
| 3,601,939 A | | 8/1971 | Clyne |
| 4,299,067 A | * | 11/1981 | Bertschi .................. 52/127.12 |
| 4,477,204 A | * | 10/1984 | Rohde et al. ............... 405/153 |
| 4,770,581 A | | 9/1988 | Limbrick |
| 4,787,793 A | | 11/1988 | Harris |
| 4,789,282 A | * | 12/1988 | Abraham .................. 411/24 |
| 4,943,195 A | * | 7/1990 | Fischer .................. 411/55 |
| 4,981,388 A | | 1/1991 | Becken et al. |
| 5,419,664 A | * | 5/1995 | Hengesbach et al. ........ 411/61 |
| 5,468,086 A | | 11/1995 | Goya |
| 5,810,505 A | * | 9/1998 | Henriott et al. ............ 403/230 |

(Continued)

FOREIGN PATENT DOCUMENTS

DE     3516423 A1     11/1985

(Continued)

*Primary Examiner*—Daniel P Stodola
*Assistant Examiner*—Nahid Amiri
(74) *Attorney, Agent, or Firm*—John R. Benefiel

(57) ABSTRACT

A connector and method for joining one end of a first wood member such as a wood log or beam to a side of a second wood member involving metal sleeves secured in aligned holes in a respective member with a protruding one of the sleeve slidable into the other sleeve. A bolt is threaded into an internally threaded element on the inner end of the sleeve in the first member and advanced to pull the members together. The sleeves are secured in the holes with spike features driven out into the surrounding wood. Alternatively, a tee connector has a plate portion fitting into a slot extending through aligned holes in the plate and one end of the first member. A cross plate is held against the one side of the other member with thread fasteners.

8 Claims, 6 Drawing Sheets

U.S. PATENT DOCUMENTS

| | | |
|---|---|---|
| 6,050,033 A | 4/2000 | Wrightman |
| 6,148,569 A * | 11/2000 | Giovannetti .............. 52/127.11 |
| 6,299,397 B1 * | 10/2001 | Mengel ....................... 411/24 |
| 6,385,929 B1 | 5/2002 | Englehart |
| 6,525,045 B2 * | 2/2003 | Winter et al. ............ 514/224.5 |
| 6,578,341 B2 | 6/2003 | Hoffmann et al. |
| 7,223,045 B2 * | 5/2007 | Migli ..................... 403/409.1 |

FOREIGN PATENT DOCUMENTS

GB 2 132 305 A 7/1984

\* cited by examiner

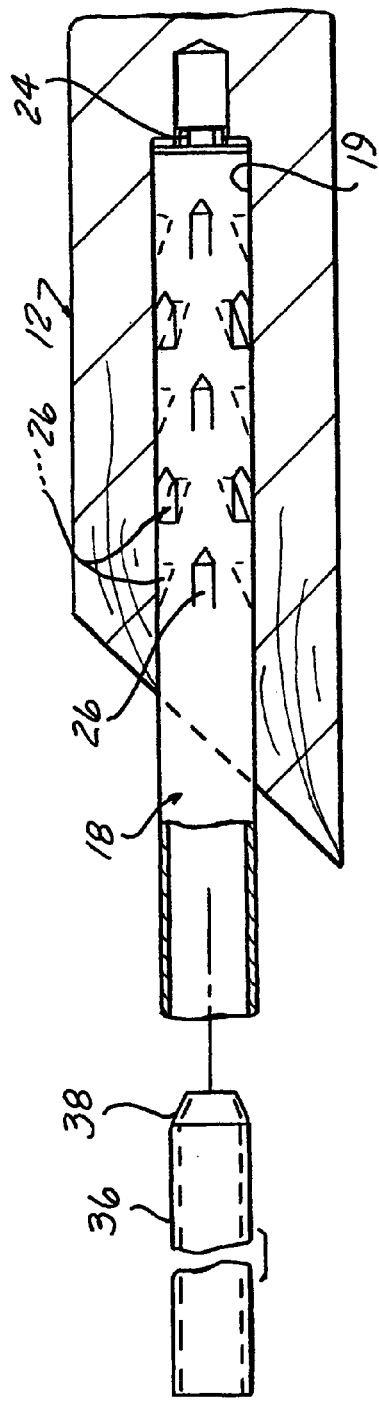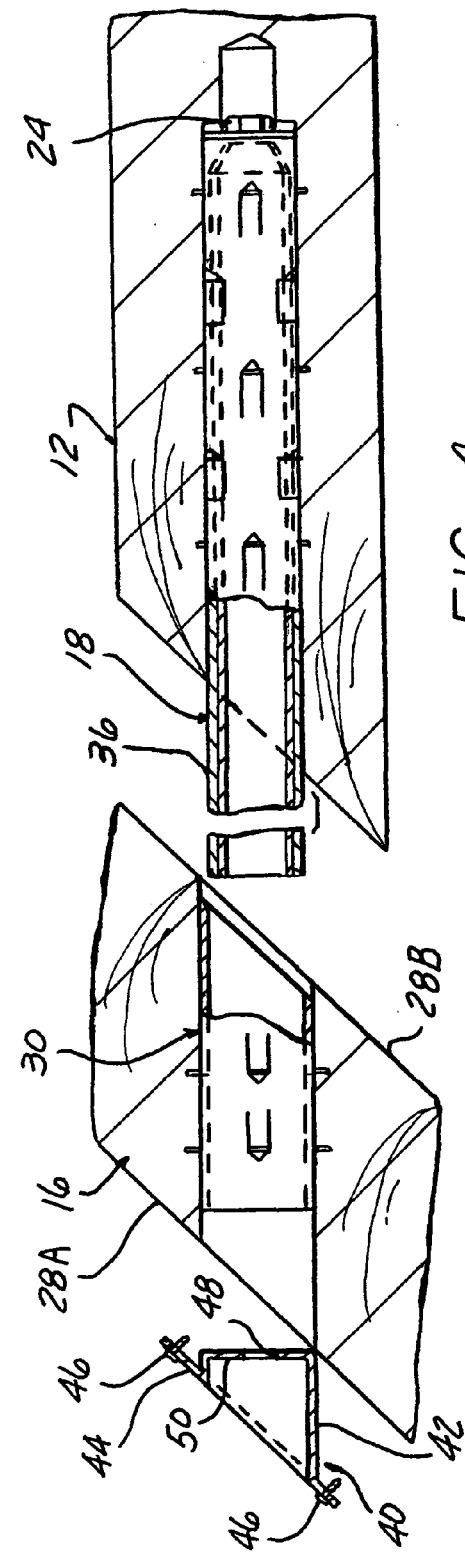

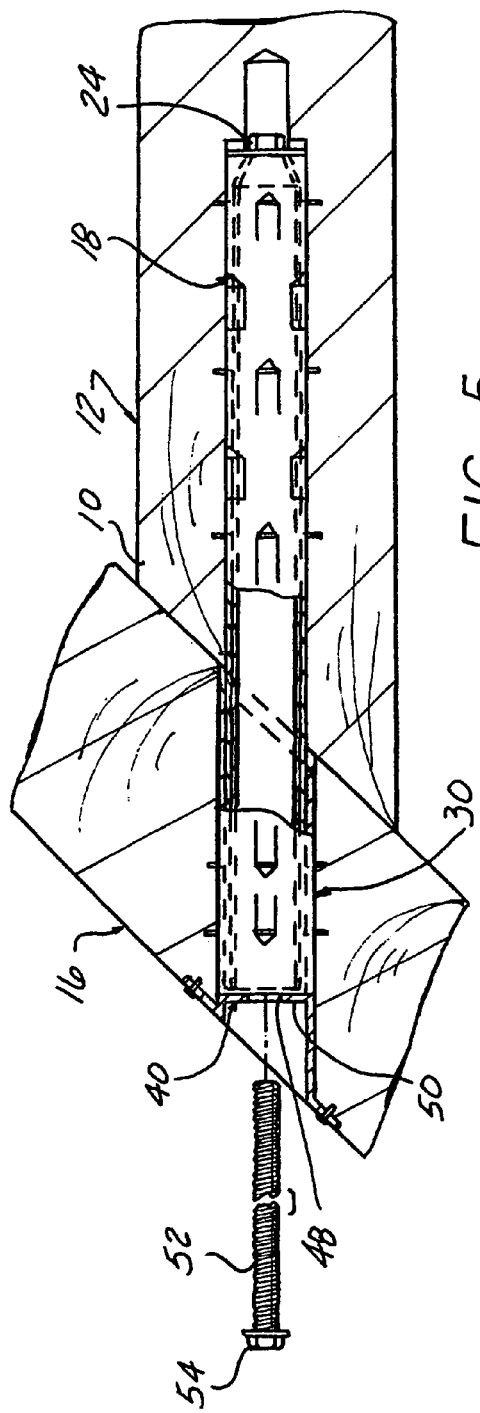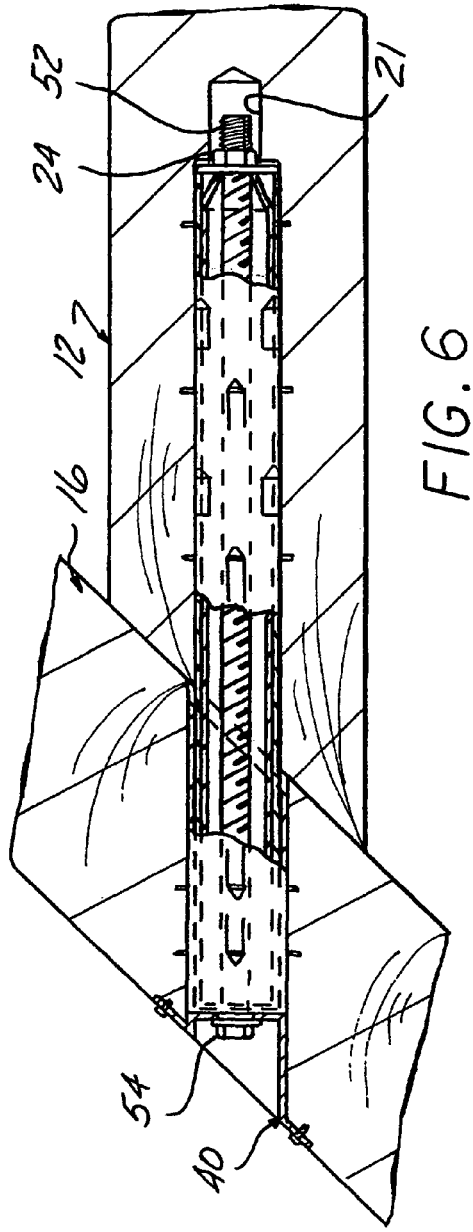

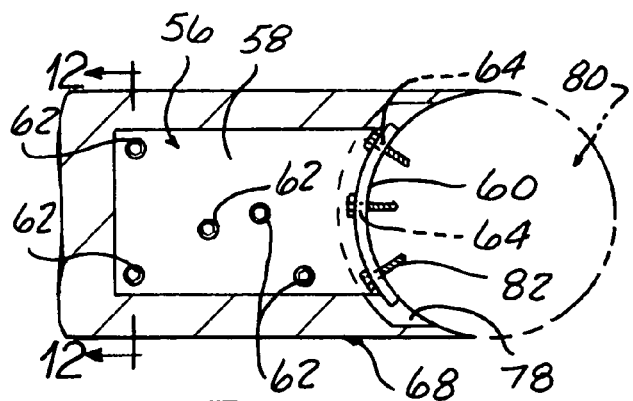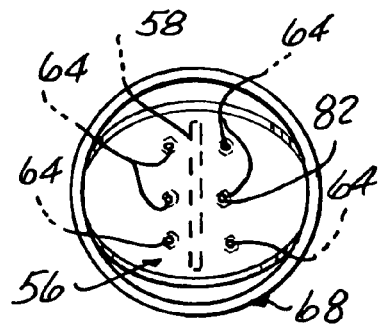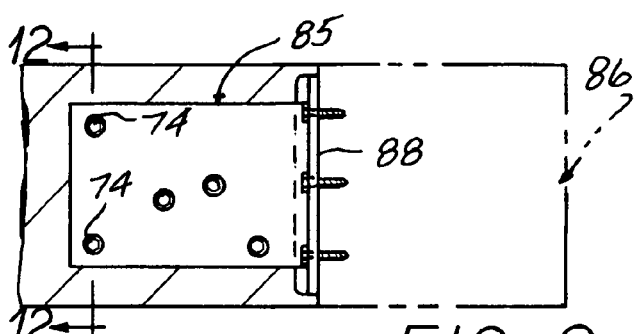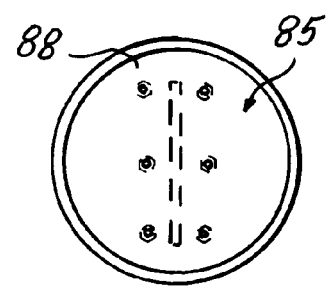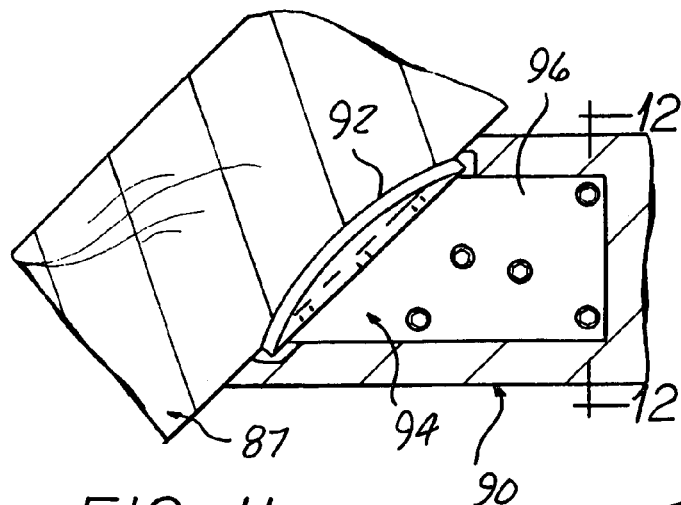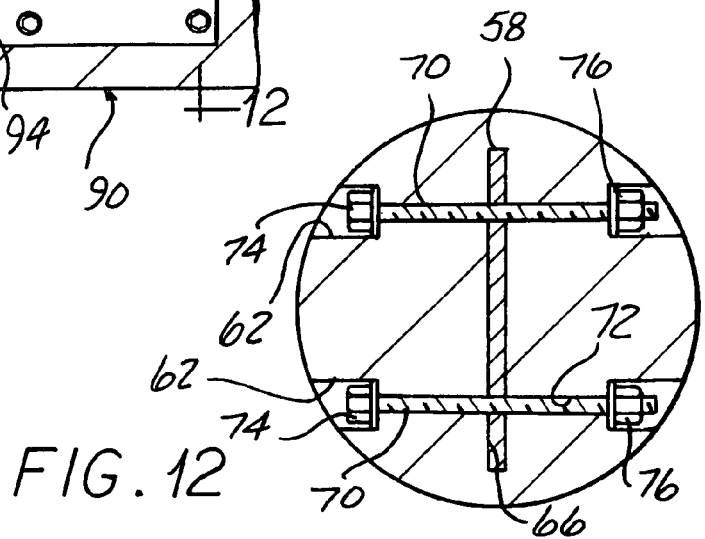
FIG. 7
FIG. 8
FIG. 9
FIG. 10
FIG. 11
FIG. 12

STRUCTURAL MEMBER JOINTS

CROSS REFERENCE TO RELATED

This application claims the benefit of U.S. provisional application No. 60/590,874 filed on Jul. 23, 2004.

BACKGROUND OF THE INVENTION

This invention concerns joinery and more particularly joining one end of a member such as a timber beam or log to the side of another member.

Such connections have heretofore been made by mortise and tenon joints or other joints involving shaping of the members themselves, by metal connectors, by lag screws or bolts, etc. For large member joints, screw threads in wood or other soft material have insufficient holding power.

All of these prior methods have disadvantages, primarily in the cost or time involved in making the joint due to the need to machine the wood or to install costly, complicated connectors or result in a joint of inadequate strength.

Many such joints use components which are conspicuously exposed, to be unsightly.

It is the object of the present invention to provide a joint between such members using simpler connectors which can be quickly and easily installed, which creates a strong joint, and involves only minimal exposed components to have a neat appearance.

SUMMARY OF THE INVENTION

The above recited object as well as other objects which will be appreciated by reading the following specification and claims are achieved by making a joint using first and second tubular metal sleeves inserted in respective holes in each member which holes can be easily and quickly made as by drilling. The first sleeve is inserted into a first hole drilled into the end of a first member with a substantial portion of its length remaining protruding out of the hole. The inserted end of the sleeve has an end wall with a weld nut attached thereto. The hole may have a smaller diameter clearance hole at its bottom to receive the protruding end of a bolt to be threaded into the nut, described below. A third, slightly smaller diameter sleeve is driven into the first sleeve, driving out an array of recessed spike features formed around and along the first sleeve out to be set into the surrounding wood to securely anchor the first sleeve therein. The third sleeve is left in position within the first sleeve to reinforce the same.

A hole is drilled through the side of the second member and the second sleeve, which is shorter than the first sleeve inserted therein, also having an array of spike features, formed therein, which are set with a tool driven into the third sleeve, which tool is then removed.

An end piece is inserted into the outside end of the through hole aligned with the second sleeve, and is attached to the opposite side of the second member as with screws.

After assembling the members together by inserting the protruding first sleeve end into the second sleeve, a long bolt is inserted through the end piece and threaded into the weld nut at the inner end of the first sleeve, and tightened against an end wall of the end piece to complete the joint.

An alternative joint connection involves a connector including a flat plate having a transverse end piece attached thereto, the plate inserted into a slot machined into the end of a first member.

Bolts are inserted into holes drilled through the first member end and through aligned holes in the plate thereafter, secured with nuts threaded on the bolt ends, the drilled holes counter-bored to recess the bolt heads and nuts.

The integral transverse piece, which may be curved to match a log surface, is seated against the second member and secured thereto with screws.

An end stabilizer is preferably used when wood members are to be joined. An annular groove is machined into the end of a log or beam and a ring pressed there into.

The spikes can be formed by first cutting pointed end three sided tabs to a metal sheet to be formed into a sleeve. The tab is then bent in to one side of the sheet to be angled out of the plane of the sheet with the pointed end pointing to the inside. Next, the end of each spike is reversely bent back so that this pointed tip points in the opposite direction. The angled tab provides a cam surface for forcing the tip out and into the surrounding wood.

DESCRIPTION OF THE DRAWINGS

FIG. 3 is a partially exploded view of a second sleeve being installed in the first sleeve shown previously shown being installed in the first member in FIG. 1.

FIG. 4 is a partially exploded view of the two members shown in FIGS. 1-3 being joined with a separated end piece being installed on the second member.

FIG. 5 is a fragmentary sectional view of the two members to be joined in abutment, with the sleeves assembled, but with a locking bolt shown in an aligned preparatory to being inserted into the sleeves.

FIG. 6 is the same view as FIG. 5 but with the locking bolt fully tightened.

FIG. 7 is a sectional view of two log members connected together at right angles using a connector according to another embodiment of the invention.

FIG. 8 is an end view of one of the log members with the connector attached.

FIG. 9 is a sectional view of a log member and a square beam connected together at right angles by a variation of the connector shown in FIG. 7.

FIG. 10 is an end view of the log member with connector attached.

FIG. 11 is a sectional view of two log members connected at an acute angle to each other with a variation of the connector shown in FIGS. 7 and 9.

FIG. 12 is a sectional view of two log members connected at an acute angle to each other with a variation of the connector shown in FIGS. 7 and 9.

DETAILED DESCRIPTION

In the following detailed description, certain specific terminology will be employed for the sake of clarity and a particular embodiment described in accordance with the requirements of 35 USC §112, but it is to be understood that the same is not intended to be limiting and should not be so construed inasmuch as the invention is capable of taking many forms and variations within the scope of the appended claims.

Figure 1:
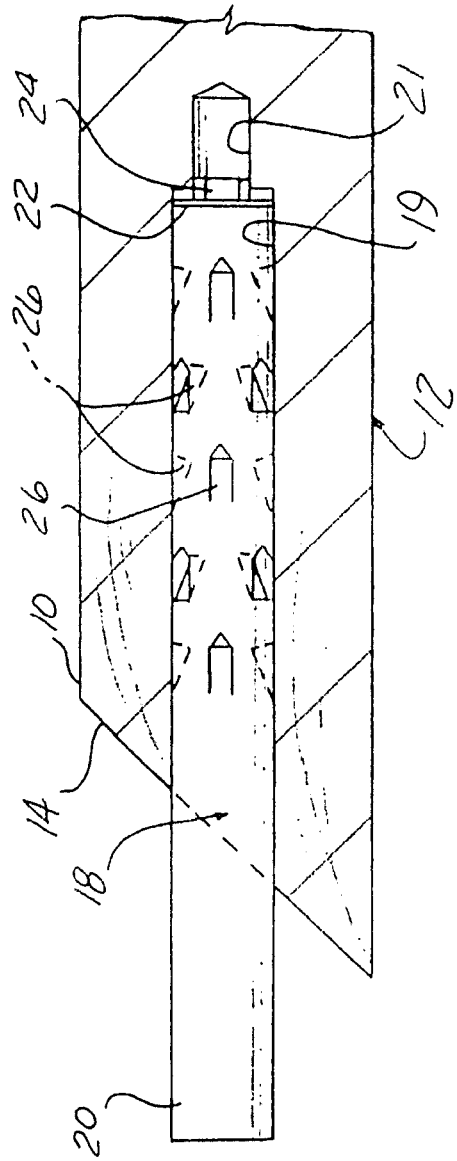
FIG. 1 is a partially sectional view of one end of a part of a wood member with a first sleeve tube installed in a drilled hole therein.
Figure 2:
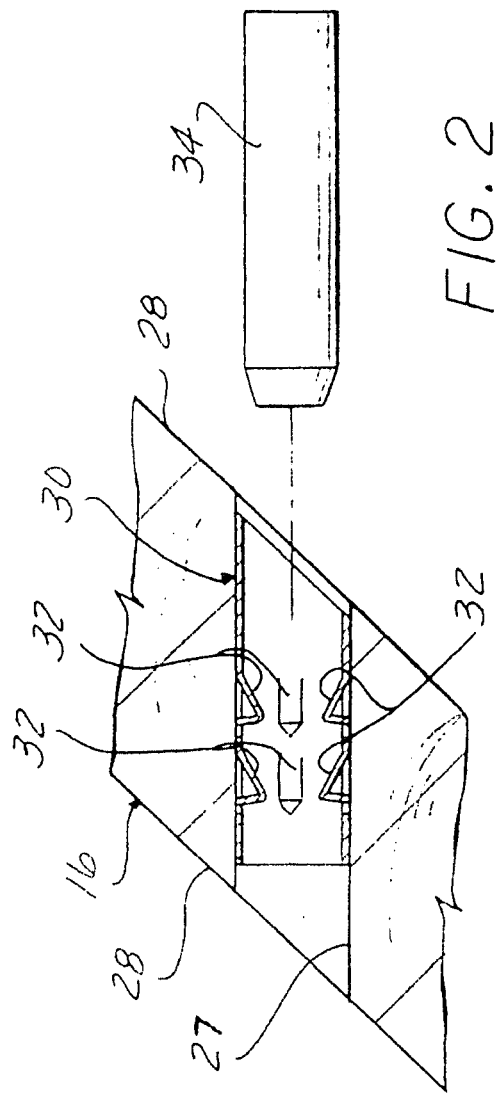
FIG. 2 is a view of an intermediate segment of a second wood member with a sleeve installed therein with a separated tool shown for setting spikes in the tube.

Referring to the drawings, and particularly FIG. 1, an end 10 of a first wood member 12 such as a log, has the face 14 cut at an angle corresponding to the angle of a joint to be made with a second wood member 16 (FIG. 2).

A hole 19 is drilled into the face 14 in a direction aligned with the longitudinal axis of the member 10.

A first metal sleeve 18, preferably of steel which is galvanized or otherwise rust protected is pressed into the hole 19.

The sleeve 18 is longer than the hole 19 so that a substantial segment 20 thereof protrudes out of the hole 19.

An end plate 22 is affixed as by welding to the end of the sleeve 18 within the hole 19 to which is in turn attached a weld nut 24 aligned with the longitudinal axis of the sleeve 18. A short clearance hole 21 allows the end of a bolt described below to protrude through the nut 24.

An array of circumferential sets of formed spike features 26 is arranged distributed along the length of the sleeve 18, with successive sets rotated out of alignment with the prior set. These features are punched or otherwise formed into the side wall of the sleeve 18 so as to be recessed below the surface of the sleeve 18 to allow unimpeded insertion into the drilled hole 18.

The second wood member 16 has a through hole 27 drilled through the sides 28 thereof at an angle normal to the angle of the face 14 of the first member.

A shorter angled end second metal sleeve 30 is inserted in the drilled hole 27. The sleeve 30 also has an array of sets of spikes 32 punched or otherwise formed into the side wall of the sleeve 30, distributed along the length of the sleeve 30 in similar fashion to the first sleeve 18.

The spikes 32 are set by a tool 34 driven into the inside of the sleeve 30, with a chamfered end 35 forcing the pointed tips of the spikes 32 out and into the surrounding wood to lock the sleeve 30 in the hole 26. The tool 34 is then removed.

Referring to FIG. 3, a third liner sleeve 36 is inserted into the previously inserted sleeve 18, of a diameter slidably fit within the sleeve 18. A chamfered lead end 38 engages the spikes 26 forcing the pointed tips out into the surrounding wood to lock the sleeve 18 in place in the hole 19. The third liner sleeve 36 is left in place and is substantially coextensive with the sleeve 18 to strengthen the same.

FIG. 4 shows the members 12, 16 positioned with the respective first, second and third sleeves 18, 30, 36 in alignment, with the second sleeve 30 of an inside diameter sized to slidably receive the protruding end of the first sleeve 18 and allow the members 12, 16 to be brought into abutment with each other the end 10 of the first member 12 against one side of the second member 16, as seen in FIG. 5.

An end piece 40 is installed in the outer end of the hole 27 in the second member 16, with a truncated sleeve portion 42 received therein and a flange 44 overlying the adjacent surfaces of the side 28A. Screws 46 are used to secure the end piece 40 in place. A clearance hole 48 is formed in an end wall 50 of the end piece 40.

A locking bolt 52 is inserted through the hole 48 and sleeves 18, 30, 36 and threadably engaged with the nut 24, and advanced therein to draw the head 54 against the end wall 50 and tightened to pull the remembers 12, 16 together, as seen in FIG. 6.

The large number of spikes 26, 32 distributed along the sleeves 18, 30 creates a holding power which is greater than can be obtained with screw threads to create a strong joint in members of wood or other soft material.

FIGS. 7 and 8 show an alternate form of joint in which a single piece metal tee connector 56 is utilized including an anchoring plate 58 and a curved cross piece 60 integral therewith extending across an outer end thereof, each having a pattern of through holes 62, 64 formed therein. As seen in FIG. 12, the anchor plate 58 is received in a slot 66 machined into the end of a first wood member 68. A series of bolts 70 pass through the holes 62 in the plate 58 and align holes 72 through the first wood member. Counter bores 74 accommodate the bolt heads 74 and nuts 76 to positively secure the plate 58 in the slot 66.

The curved cross piece 60 is recessed into a curved space 78 machined into the end of the first member.

The outwardly concave shape allows a second wood member, log 80 to be received against the curved cross piece 60, secured thereto with lag screws 82.

For square or rectangular timbers 86, a flat cross piece 84 can be used in a connector 85 to abut flat against the same (FIGS. 9, 10).

FIG. 11 shows an angled joint in which a first log member 88 is connected at an angle to a second member 90 using a concavely curved cross piece 92 of another formed connector 94 attached at an angle to the anchor plate 96.

Figure 13:
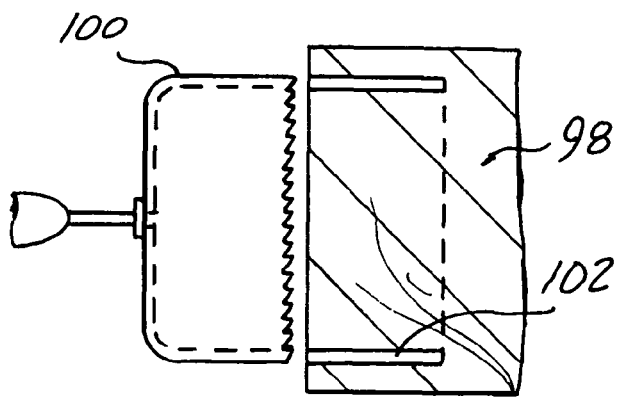
FIG. 13 is a partially exploded view of an end of a log member and a withdrawn hole saw used to cut an annular groove into the log end.

FIG. 13 shows a step in an end reinforcement method for a log 98 in which a hole saw 100 is used to cut an annular groove 102.

Figure 14:
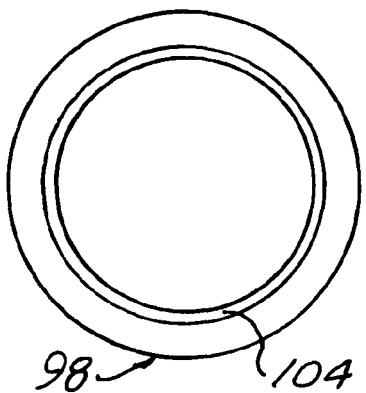
FIG. 14 is an end view of the log end shown in FIG. 13 with a ring stabilizer pressed therein.
Figure 15:
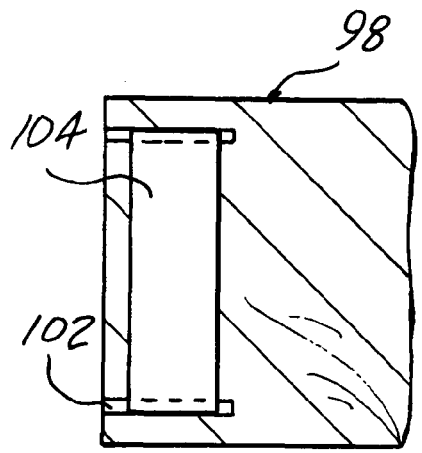
FIG. 15 is a partially sectional view of the log end of FIGS. 13 and 14 with the stabilizer ring in place.

A steel metal ring 104, (preferably of steel) is pressed into the groove 102 serving to prevent splitting, etc. (FIGS. 14, 15). This can be used in conjunction with the joints described above.

FIGS. 16-19B show details of the spikes 26 and 32.

Figure 16:
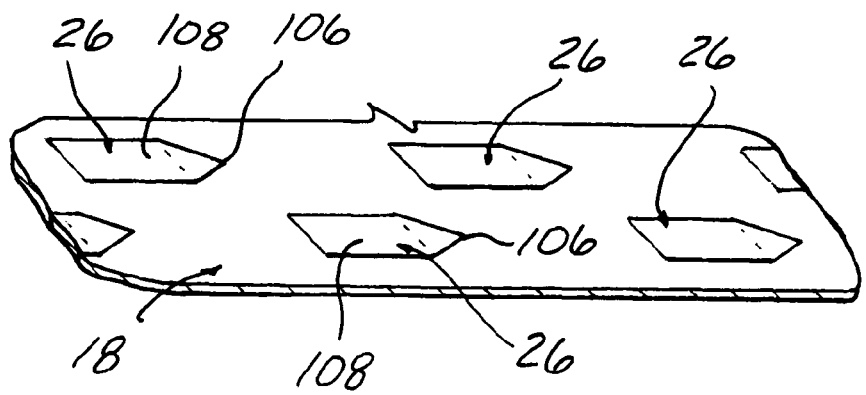
FIG. 16 is a fragmentary partially sectional enlarged view of a metal plate used to form the spiked sleeves used in the connector shown in FIGS. 1-6.
Figure 17A:
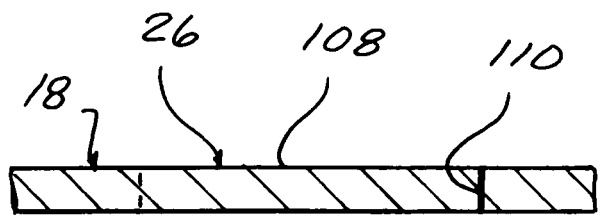
FIG. 17A is a fragmentary side view of the sheet section shown in FIG. 16.
Figure 17B:
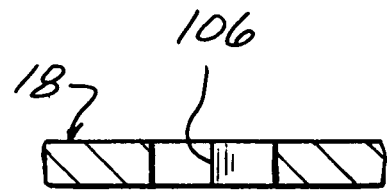
FIG. 17B is an end view of the sheet section shown in FIG. 17A.
Figure 18A:
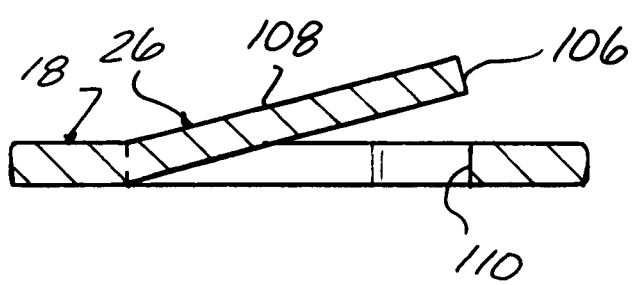
FIG. 18A is a side view of the sheet section with the tab bent up out of the plane of the sheet.
Figure 18B:
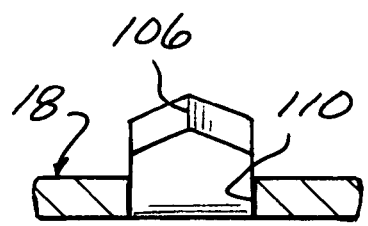
FIG. 18B is an end view of the sheet section shown in FIG. 18A.

First, a three sided tab comprises the spike 26 outline is cut as by punching or laser cutting, with a pointed shape 106 at the end, as seen in FIGS. 16, 17A, 17B.

Next, the spike-tabs 26 are bent in towards what will be the inside of the sleeve 18, (FIGS. 18A, 18B) along the connected side of the tab-spike 26. That is, the tab-spikes 26 can be formed in steel sheet stock prior to forming the sleeve 18, with the sheet rolled and welded to form the sleeve 18.

Figure 19A:
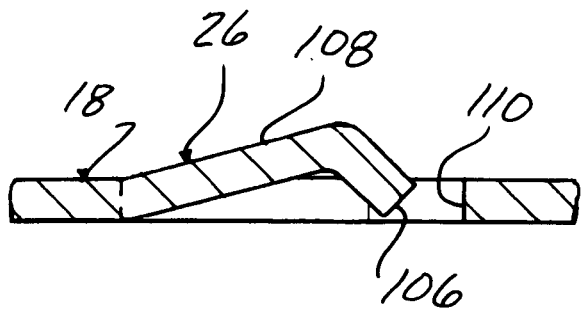
FIG. 19A is a side view of the sheet section with the end of the tab bent outwardly.
Figure 19B:
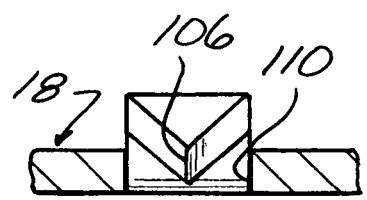
FIG. 19B is an end view of the sheet section shown in FIG. 19A.

Finally, the pointed end of each spike is bent down to be pointed down towards the other side of the sheet as seen in FIG. 19A, 19.

Thus, the sloping backside 108 provides a camming surface recessed within the sleeve 18 for engagement by the third liner sleeve 36 to force the sharp tips 106 out and into the surrounding wood when the liner sleeve is driven into the sleeve 18. The spikes 26 are initially completely recessed within the first sleeve 18 to allow the sleeve 18 to be slidably seated within the hole 19.

The spikes 32 can be made in the same way.

The large number of spikes 26, 32 create considerable holding power in wood compared to screws.

Each set of spikes 26, 32 are arranged circumferentially with four or more in each set depending on the size of the sleeves. Succeeding sets are distributed axially down the length of the sleeve, each set rotated to be located between spikes in the previous set so as to not be aligned and thereby better distribute the stress imposed on the wood.

The connector and joint can be used with members of other material such as plastic which can be penetrated by the spikes as described.

The invention claimed is:

1. A joint between two penetrable members in a position with
    a surface of a first member abutting against a surface of a second member, comprising
    a first sleeve secured within a first hole extending in from said first member surface by engagement with surrounding portions of said first member defining said first hole;
    a second sleeve separate from said first sleeve fixedly secured in a second hole extending through said second member by engagement with surrounding portions of said second member defining said second hole, said sleeves overlapping with said first sleeve having an end portion protruding from said first member and slidably received within an inside diameter of said second sleeve with said surfaces of said members in said abutting position against each other;
    an internally threaded element secured adjacent to an inmost end of said first sleeve in said first hole;
    a threaded locking bolt extending through both of said sleeves and threaded into said internally threaded element fixed to said first sleeve, said bolt having a head engaging a surface fixed relative said second member to enable said first and second sleeves to be drawn together by threaded advancement of said bolt in said element each of said sleeves are secured in their respective associated holes by penetrating spike features on said sleeves penetrating radially into portions of said penetrable members surrounding said holes, and a third sleeve extends into the inside of the first sleeve to force said spike features thereon radially outwardly into said portions of said first member defining said first hole and driving a cylindrical tool into said second sleeve to drive said spikes radially out into said second member; and;
    an end piece having a sleeve portion fit into said hole in said second member and against an end of said second sleeve remote from said first member and also having an end wall comprising said surface fixed relative said second member abutted by said head on said bolt with an opening therein allowing a body portion of said bolt to pass through said end wall.

2. The joint according to claim 1 wherein said third sleeve extends substantially coextensively within said first sleeve including said protruding portion.

3. The joint according to claim 1 wherein said end piece has a flange portion overlying a side surface of said second member adjacent said hole therein securing said end wall fixed relative said second member.

4. The joint according to claim 3 wherein said flange is fastened to said second member.

5. The joint according to claim 1 wherein said members are wood.

6. A method of joining a first penetrable member to a second penetrable member with respective surfaces thereof in abutment, including forming a first hole extending into a surface of said first penetrable member;
    inserting a first sleeve into said first hole and securing the same therein by attachment to surrounding portions of said first member defining said first hole;
    forming a second hole extending through said second member and said surface of said first member;
    separately inserting a second sleeve separate from said first sleeve into said hole in said second member;
    securing said first and second sleeves to said first and second members respectively by forcing spike features formed inside each of said sleeves out into said surrounding portions of said respective members defining said first and second holes by forcing a third sleeve into the inside of said first sleeve to force said spike features thereon radially outwardly into said portions of said first member defining said first hole and driving a cylindrical tool into said second sleeve to drive said spikes radially out into said second member;
    configuring said first sleeve to protrude out of said first hole and slidably fit in an inside diameter of said second sleeve when said respective surfaces of said members are positioned against each other;
    inserting a threaded bolt through said sleeves from an opposite side of said second member and threading the same into an internally threaded element fixed at the inside end of said first sleeve, with a head on said bolt engaging a surface fixed relative said second member so that said first and second members are drawn together by advancement of said threaded bolt in said internally threaded element.

7. The method according to claim 6 further including leaving said third sleeve in place therein after creating said joint.

8. The method according to claim 6 further including installing an end piece in said second hole in said second member on a side opposite said surface of said second member, and affixing one or more flanges thereon to said second member, and engaging said bolt head with an end wall on said end piece to cause said first and second members to be pulled together upon advancement of said bolt in said element.

* * * * *